United States Patent
Sun et al.

(10) Patent No.: US 11,304,154 B2
(45) Date of Patent: Apr. 12, 2022

(54) APPARATUS AND METHOD FOR SIGNALING TRANSMISSION POWER

(71) Applicant: Lenovo (Beijing) Limited, Beijing (CN)

(72) Inventors: Zhennian Sun, Beijing (CN); Chenxi Zhu, Beijing (CN); Hongmei Liu, Beijing (CN); Wei Ling, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 16/758,812

(22) PCT Filed: Nov. 1, 2017

(86) PCT No.: PCT/CN2017/108982
§ 371 (c)(1),
(2) Date: Apr. 23, 2020

(87) PCT Pub. No.: WO2019/084856
PCT Pub. Date: May 9, 2019

(65) Prior Publication Data
US 2020/0267666 A1    Aug. 20, 2020

(51) Int. Cl.
*H04W 52/34* (2009.01)
*H04W 52/36* (2009.01)

(52) U.S. Cl.
CPC ......... *H04W 52/346* (2013.01); *H04W 52/36* (2013.01)

(58) Field of Classification Search
CPC combination set(s) only.
See application file for complete search history.

(56) References Cited

U.S. PATENT DOCUMENTS

| | | | | |
|---|---|---|---|---|
| 2014/0198772 A1* | 7/2014 | Baldemair | .......... | H04L 27/2692 370/335 |
| 2018/0359717 A1* | 12/2018 | Akkarakaran | .... | H04W 52/0261 |
| 2019/0053313 A1* | 2/2019 | Zhou | ..................... | H04B 17/103 |
| 2020/0137691 A1* | 4/2020 | Mao | ....................... | H04W 52/24 |
| 2020/0404593 A1* | 12/2020 | Yao | ...................... | H04W 52/242 |
| 2021/0368451 A1* | 11/2021 | Gong | .................... | H04W 52/08 |

FOREIGN PATENT DOCUMENTS

| | | | |
|---|---|---|---|
| CN | 101436899 A | 5/2009 | |
| EP | 1244228 A2 | 9/2002 | |
| KR | 20180108362 A | * 10/2018 | |
| WO | 2014111893 A2 | 7/2014 | |
| WO | WO-2019029165 A1 * | 2/2019 | ............ H04W 52/10 |
| WO | WO-2019050316 A1 * | 3/2019 | ............ H04W 56/00 |

OTHER PUBLICATIONS

PCT/CN2017/108982, "International Search Report and the Written Opinion of the International Search Authority" ISA/CN, State Intellectual Property Office of the P.R. China, dated Jul. 23, 2018, pp. 1-6.

* cited by examiner

*Primary Examiner* — Lewis G West
(74) *Attorney, Agent, or Firm* — Kunzler Bean & Adamson

(57) ABSTRACT

The present disclosure relates to methods and apparatuses. According to some embodiments of the disclosure, a method includes categorizing a number of synchronization signal (SS) blocks into M groups, each group having N SS blocks, wherein M and N are integers and assigning a power level for P transmitted group (s), wherein P is an integer and $1 \leq P \leq M$. The SS blocks in each of the P transmitted groups are transmitted in a same assigned power level.

23 Claims, 13 Drawing Sheets

APPARATUS AND METHOD FOR SIGNALING TRANSMISSION POWER

TECHNICAL FIELD

The present disclosure relates to communication technology, and more particularly relates to wireless communication.

BACKGROUND

In 3GPP (third generation partnership project) standards, certain agreements were made to improve communication performance and power consumption. In a Long Term Evolution (LTE)/LTE-Advanced (LTE-A) system, a base station (such as gNB) or a plurality of base stations may indicate or determine the transmission power of cell-specification reference signal (CRS) for each call and transmit or signal the transmission power to the user equipment (UE) in System information Block (SIB). However, a relatively great number of bits are required to indicate transmission power of every transmitted synchronization signal (SS) block, which leads to signal overhead. Thus, it is desirable to develop a method and/or an apparatus to signal the transmission power efficiently.

SUMMARY OF THE DISCLOSURE

According to some embodiments of the present disclosure, a technical solution is provided to signal transmission power in a wireless network.

According to some embodiments of the present disclosure, a method includes categorizing a number of synchronization signal (SS) blocks into M groups, each group having N SS blocks, wherein M and N are integers and assigning a power level for P transmitted group(s), wherein P is an integer and $1<=P<=M$. The SS blocks in each of the P transmitted groups are transmitted in a same assigned power level.

According to some embodiments of the present disclosure, a method includes categorizing a number of SS blocks into M groups, each group having N SS blocks, wherein M and N are integers and assigning a power level for P transmitted group(s), wherein P is an integer and $1<=P<=M$. The SS blocks having a first ordinal in each of the P transmitted groups are transmitted in a same power level.

According to some embodiments of the present disclosure, a method includes determining a reference power level for transmitting M SS blocks, wherein M is an integer and assigning an offset value relative to the reference power level for each of the M SS blocks.

According to some embodiments of the present disclosure, a method includes determining a power level for transmitting a first SS block of a number of M SS blocks as a reference power level, wherein M is an integer and assigning an offset value relative to the reference power level to each of the number of M SS blocks except the first SS block.

Embodiments of the disclosure also provide apparatuses, which can perform the above methods. For example, in some embodiments of the present disclosure, an apparatus including a processor or a transmitter configured to perform or execute the above methods.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope.

DETAILED DESCRIPTION

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

Figure 1:
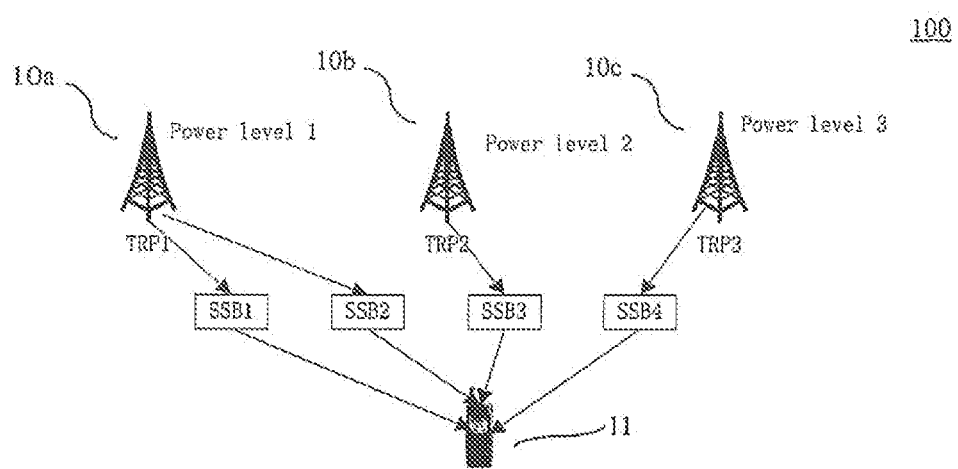
FIG. 1 illustrates a wireless communication system according to some embodiments of the present disclosure.

FIG. 1 illustrates a wireless communication system 100 according to some embodiments of the present disclosure. The wireless communication system 100 includes base stations 10a, 10b, 10c and an UE 11.

The base stations 10a, 10b, 10c may operate based on agreements described in 3G, LTE/LTE-A, 4G or 5G communication standard. For example, the base stations 10a, 10b, 10c may include eNB(s), gNB(s), etc. In some embodiments, the base stations 10a, 10b, 10c may also be referred to as TX/RX point (TRP), such as TRP1, TRP2 and TRP3. In some embodiments of the present disclosure, each of the base stations 10a, 10b, 10c may be controlled by a control unit (not shown in FIG. 1, e.g. a server, a processor, a computer or the like). In some embodiments, the base stations 10a, 10b, 10c are different from each other (heterogeneous). For example, the base stations 10s, 10b, 10c include different transmission power levels (e.g., power level 1, power level 2 and power level 3). In a LTE or LTE-A or 5G system, the base stations 10a, 10b, 10c would indicate or determine the transmission power level of SS blocks SSB1, SSB2, SSB3, SSB4 for each call, and the indicated transmission power levels would be transmitted or signaled to the UE 11 in SIB or RMSI.

As shown in FIG. 1, the SS blocks SSB1, SSB3 and SSB4 are transmitted from different base stations 10a, 10b, 10o, and thus the transmission power levels assigned to the SS blocks SSB1, SSB3 and SSB4 may be different from one another. The SS blocks SSB1 and SSB2 are transmitted from the same base station 10a, and the SS blocks SSB1 and SSB2 may include the same transmission power level.

Figure 2:
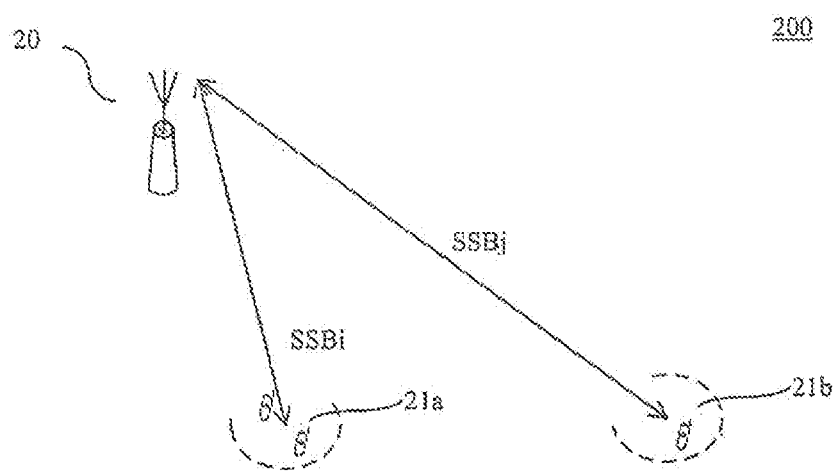
FIG. 2 illustrates a wireless communication system according to some embodiments of the present disclosure.

FIG. 2 illustrates a wireless communication system 200 according to some embodiments of the present disclosure. The wireless communication system 200 includes a base station 20 and UEs 21a, 21b.

The base station 20 is similar or same to the base station 10a, 10b or 10c as described and illustrated with reference to FIG. 1. In some embodiments, the base station 20 may determine or indicate different transmission power levels for SS blocks depending on parameters in a communication environment (e.g., distance between the base station and the UE, transmission angle between the base station and the UE, or the like). For example, as shown in FIG. 2, a distance between the UE 21b and the base station 20 is greater than a distance between the UE 21a and the base station 20. The power level assigned to the SS block SSBj (which is transmitted to the UE 21b) may be greater than the power level assigned to the SS block SSBi (which is transmitted to the UE 21a).

In 3GPP RAN1#90, the UE may compute pathloss based on the transmission power of SS blocks and SS block reference signal receive power (RSRP). At least one transmission power level is assigned for the SS block and sent to the UE in RMSI. In some embodiments, different SS blocks in an SS burst set can be transmitted with different power levels and/or with different TX beamforming gains at least as NW implementation. With respect to the indication of the SS blocks transmitted below 6 GHz, full bitmap (e.g., 8 bits) is used for indication of actual SS/PBCH block transmission at least for rate matching purpose for serving cell.

In some embodiments, UE-specific RRC signaling with full bitmap can be used for indicating the SS blocks that are transmitted below 6 GHz or over 6 GHz. In the case that the SS blocks are transmitted over 6 GHz, the indication method can be selected from any of the following approaches:
Approach 1: the indication is expressed by Group-Bitmap and Bitmap in Group. The Group is defined as consecutive SS/PBCH blocks. Bitmap in Group can indicate which SS/PBCH block is actually transmitted within a Group. The patterns for each Group and SS/PBCH block transmission are the same. Group-Bitmap can indicate which Group is actually transmitted.

Approach 2: the indication is expressed by Group-Bitmap and the number of transmitted SS/PBCH block(s) in the Group (with a fixed starting index of SS/PBCH block). The Group is defined as consecutive SS/PBCH blocks. Group-Bitmap can indicate which Group is actually transmitted. SS/PBCH blocks within a Group are logically consecutive. The number of transmitted SS/PBCH blocks indicates how many logically consecutive SS/PBCH blocks are actually transmitted, wherein the indication starts from the first index, and the number is commonly applied to all transmitted Groups.

Approach 3: the indication is expressed by Bitmap in Group and the number of actually transmitted Groups (with a fixed starting index of the Group). The Group is defined as consecutive SS/PBCH blocks. Bitmap in Group can indicate which SS/PBCH block is actually transmitted within a Group. The patterns for each Group and SS/PBCH block transmission are the same. The number of transmitted Groups indicates how many consecutive Groups are actually transmitted starting from the first Group.

Approach 4: the indication is expressed by Group-Bitmap and the number of actually transmitted SS/PBCH blocks in each Group. The Group is defined as consecutive SS/PBCH blocks. Group-Bitmap can indicate which Group is actually transmitted. SS/PBCH blocks within a Group are logically consecutive. The number of transmitted SS/PBCH blocks for each Group indicates how many logically consecutive SS/PBCH blocks are actually transmitted starting from the first index.

Approach 5: the indication is expressed by the number of transmitted SS/PBCH blocks, starting index and the gap between two consecutive SS/PBCH blocks.

Approach 6: the indication is expressed by Group-Bitmap. The Group is defined as consecutive SS/PBCH blocks. Group-Bitmap can indicate which Group is actually transmitted. All SS/PBCH blocks within a transmitted Group are actually transmitted.

Figure 3:
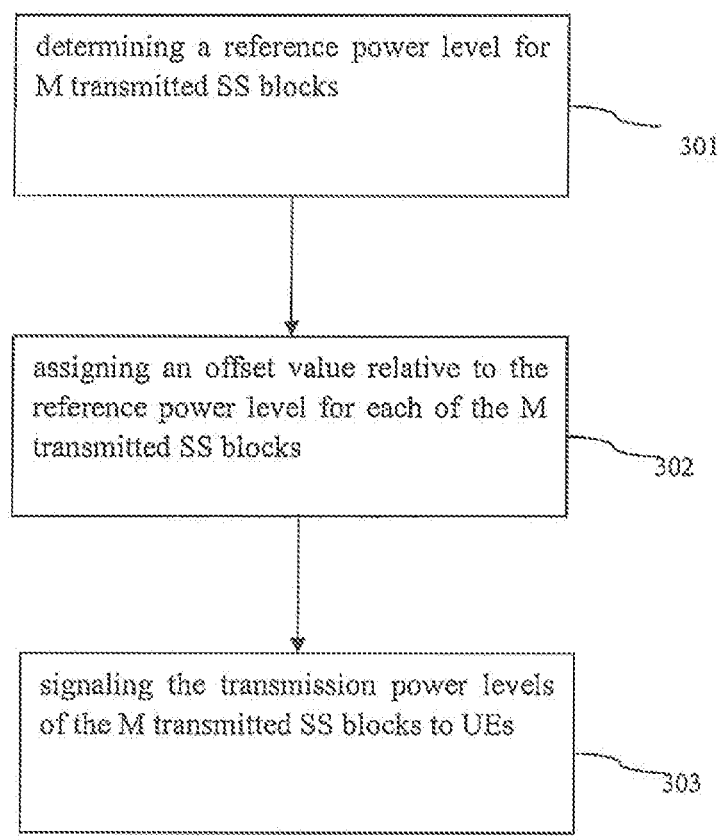
FIG. 3 illustrates a method of signaling transmission power levels for SS blocks according to some embodiments of the present disclosure.

FIG. 3 illustrates a method of signaling transmission power levels for SS blocks according to some embodiments of the present disclosure.

In 301, a reference power level is determined for M transmitted SS blocks, wherein M is an integer. In some embodiments, the reference power level is an absolute transmission power (dBm). In some embodiments, M is 64 or any other integers. In some embodiments, the reference power level can be determined by X bits, wherein X is an integer. In some embodiments, X is 7 or any other integers.

In 302, an offset value relative to the reference power level is assigned for each of the M transmitted SS blocks. The offset value is a difference between the power level of the assigned SS block and the reference power level. In some embodiments, the offset value can be determined by: Y bits, wherein Y is an integer. For example, the offset value can be expressed by 2 bits, such as $\{-3, 0, +3, +6\}$ (dBm) or any other number of bits.

In 303, the power levels of the M transmitted SS blocks are transmitted or signaled to UEs. In some embodiments, the power levels of the M transmitted SS blocks can be determined by Z bits, wherein Z is an integer. In some embodiments, $Z=X+M*Y$. As compared to some approaches that the power level of each SS block is assigned for an absolute power level/value, the total number (i.e., Z) of the bits for signaling the power levels of the M transmitted SS blocks can be reduced since the number of bits for determining an offset value is less than that for determining an absolute power level/value (e.g., Y is less or smaller than X).

Figure 4:
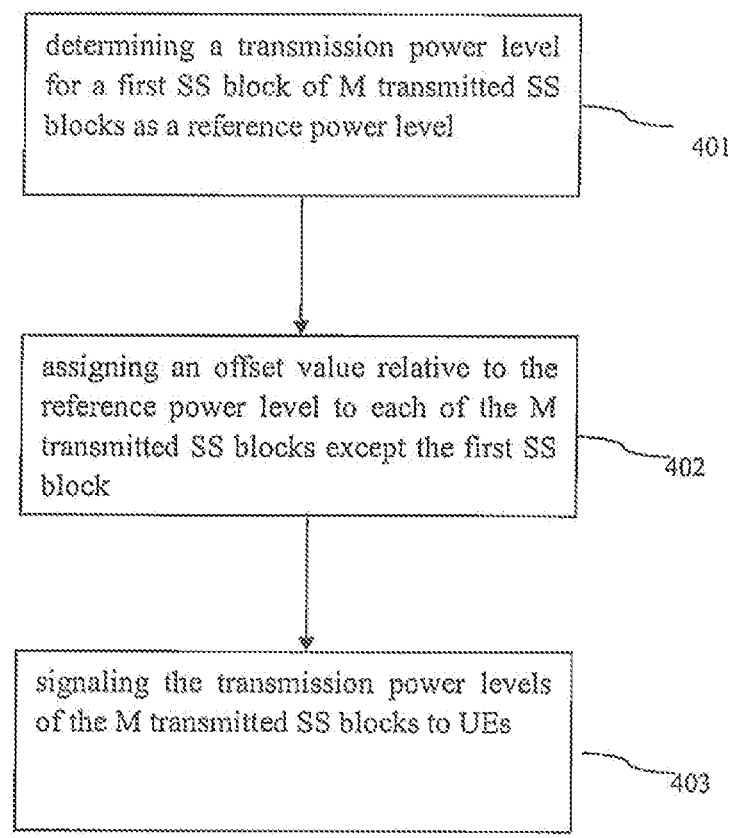
FIG. 4 illustrates a method of signaling transmission power levels for SS blocks according to some embodiments of the present disclosure.

FIG. 4 illustrates a method of signaling transmission power levels for SS blocks according to some embodiments of the present disclosure.

In 401, a reference power level is determined for one of M transmitted SS blocks (also referred to as "the first SS block"), wherein M is an integer. In some embodiments, the reference power level is an absolute transmission power (dBm). In some embodiments, M is 64 or any other integers. In some embodiments, the reference power level can be determined by X bits, wherein X is an integer. In some embodiments, X is 7 or any other integers.

In 402, an offset value relative to the reference power level is assigned for each of the M transmitted SS blocks except the first SS block. For example, the offset value is assigned for each of the rest transmitted SS blocks. The offset value is a difference between the power level of the assigned SS block and the reference power level. In some embodiments, the offset value can be determined by Y bits, wherein Y is an integer. For example, the offset value can be expressed by 2 bits, such as $\{-3, 0, +3, +6\}$ (dBm) or any other number of bits.

In 403, the power levels of the M transmitted SS blocks are transmitted or signaled to UEs. In some embodiments, the power levels of the M transmitted SS blocks can be determined by Z bits, wherein Z is an integer. In some embodiments, $Z=X+(M-1)*Y$. As compared to the embodiment shown in FIG. 3, since the transmission power level of one of the transmitted SS blocks is used or assigned or determined as the reference power level, the total number (i.e., Z) of the bits for signaling the power levels of the M transmitted SS blocks can be further reduced.

Figure 5A:
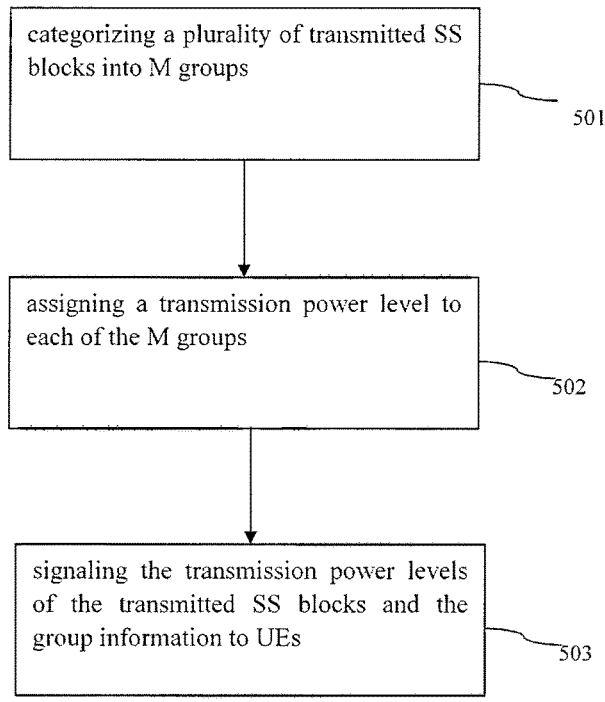
FIG. 5A illustrates a method of signaling transmission power levels for SS blocks according to some embodiments of the present disclosure.

FIG. 5A illustrates a method of signaling transmission power levels for SS blocks according to some embodiments of the present disclosure.

Figure 5B:
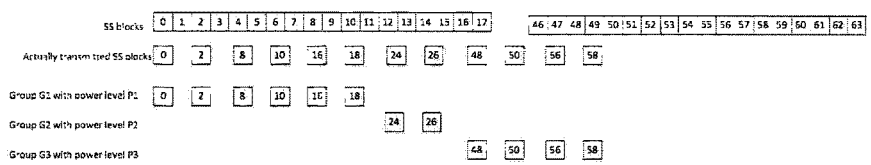
FIG. 5B illustrates an example of signaling transmission power levels for SS blocks according to some embodiments of the present disclosure.

In 501, a number of SS blocks are categorized into M groups, wherein M is an integer. For example, referring to FIG. 5B, which illustrates an example of signaling transmission power levels for SS blocks according to some embodiments of the present disclosure, 64 SS blocks (SS block 0, SS block 1 . . . SS block 63) are illustrated, and SS block 0, SS block 2, SS block 8, SS block 10, SS block 16, SS block 18, SS block 24, SS block 26, SS block 48, SS block 50, SS block 56 and SS block 58 are transmitted. As shown in FIG. 5B, a base station may configure SS block 0, SS block 2, SS block 8, SS block 10, SS block 16 and SS block 18 into a group G1, configure SS block 24 and SS block 26 into a group G2 and configure SS block 48, SS block 50, SS block 56 and SS block 58 into a group G3.

Referring back to FIG. 5A, in 502, a transmission power level is assigned to each of the M groups, wherein M is an integer. In some embodiments, the transmission power level is an absolute transmission power (dBm). In some embodiments, each transmission power level can be determined by X bits, wherein X is an integer. In some embodiments, X is 7 or any other integers. In some embodiments, the SS blocks in the group include or share a same power level. For example, referring to FIG. 5B, the SS blocks in the group G1 (including SS block 0, SS block 2, SS block 8, SS block 10, SS block 16 and SS block 18) are transmitted in the same power level P1. In some embodiments, the SS blocks of the group G1, the group G2 and the group G3 include different power levels. For example, the SS blocks of group G1 are transmitted with power level P1, the SS blocks of group G2 are transmitted with power level P2, and the SS blocks of groups G3 are transmitted with power level P3. The power level P1 may be the same to the power level P2. The power level P1 may be different from the power level P2. The power level P1 may be the same to the power level P3. The power level P1 may be different from the power level P3. The power level P2 may be the same to the power level P3. The power level P2 may be different from the power level P3.

Referring back to FIG. 5A, in 503, the transmission power levels of the transmitted SS blocks and group information are transmitted or signaled to UEs. In some embodiments, the transmission power levels of the transmitted SS blocks can be determined by Z bits, wherein Z is an integer. In some embodiments, $Z=X*M$. Because the transmitted SS blocks are categorized into groups and then the transmission power level is assigned to each group rather than each SS block, the total number (i.e., Z) of the bits for signaling the transmission power levels of the transmitted SS blocks can be reduced.

Figure 6:
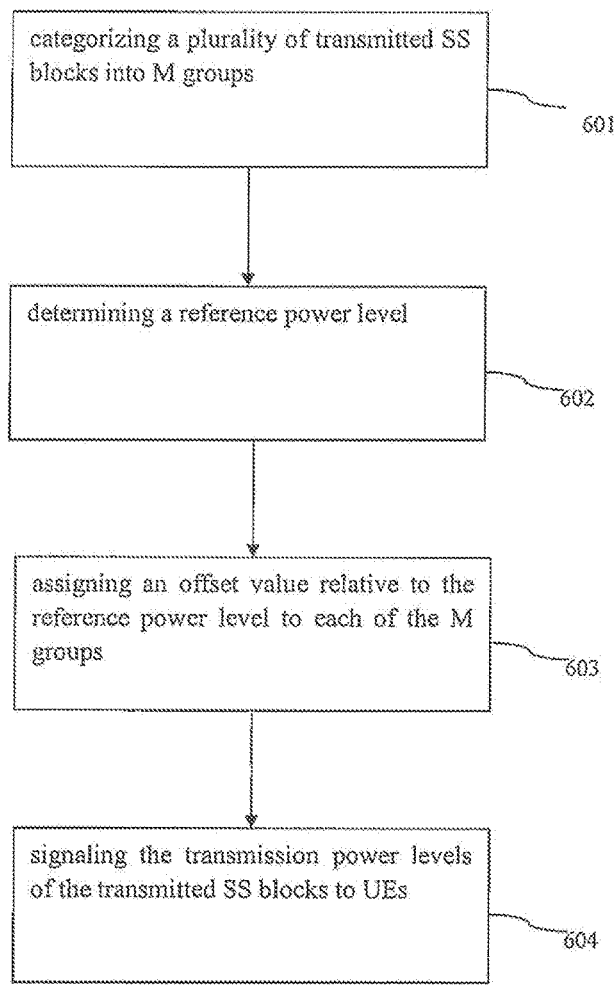
FIG. 6 illustrates a method of signaling transmission power levels for SS blocks according to some embodiments of the present disclosure.

FIG. 6 illustrates a method of signaling transmission power levels for SS blocks according to some embodiments of the present disclosure.

In 601, a number of SS blocks are categorized into M groups, wherein M is an integer. For example, as shown in FIG. 5B, 64 SS blocks (SS block 0, SS block 1 . . . SS block 63) are illustrated, where SS block 0, SS block 2, SS block 8, SS block 10, SS block 16, SS block 18, SS block 24, SS block 26, SS block 48, SS block 50, SS block 56 and SS block 58 are transmitted. As shown in FIG. 5B, a base station may configure SS block 0, SS block 2, SS block 8, SS block 10, SS block 16 and SS block 18 into a group G1, configure SS block 24 and SS block 26 into a group G2 and configure SS block 48, SS block 50, SS block 56 and SS block 58 into a group G3.

Referring back to FIG. 6, in 602, a reference power level is determined for the M groups. In some embodiments, the reference power level is an absolute transmission power (dBm). In some embodiments, the reference power level can be determined by X bits, wherein X is an integer. In some embodiments, X is 7 or any other integers.

In 603, an offset value relative to the reference power level is assigned for each of the M groups. The offset value is a difference between the power level of the assigned group and the reference power level. In some embodiments, the offset value can be determined by Y bits, wherein Y is an integer. For example, the offset value can be expressed by 2 bits, such as $\{-3, 0, +3, +6\}$ (dBm) or any other number of bits. In some embodiments, the SS blocks in the group include or share a same power level (e.g., a sum of the reference power level plus the offset value). For example, the SS blocks in the group G1 (including SS block 0, SS block 2, SS block 8, SS block 10, SS block 16 and SS block 18) are transmitted in the same power level. In some embodiments, the SS blocks of the group G1, the group G2 and the group G3 include different power levels. For example, the SS blocks of group G1 are transmitted with offset 1, the SS blocks of group G2 are transmitted with offset 2, and the SS blocks of groups G3 are transmitted with offset 3. The offset 1 may be the same to the offset 2. The offset 1 may be different from the offset 2. The offset 1 may be the same to the offset 3. The offset 1 may be different from the offset 3. The offset 2 may be the same to the offset 3. The offset 2 may be different from the offset 3.

In 604, the transmission power levels of the transmitted SS blocks are transmitted or signaled to UEs. In some embodiments, the transmission power levels of the transmitted SS blocks can be determined by Z bits, wherein Z is an integer. In some embodiments, $Z=X+M*Y$. Because the transmitted SS blocks are categorized into groups and then the transmission power level is assigned to each group rather than each SS block, the total number (i.e., Z) of the bits for signaling the transmission power levels of the transmitted SS blocks can be reduced.

Moreover, as compared to the embodiment of FIG. 5A, the total number (i.e., Z) of the bits for signaling the power levels of the transmitted SS blocks can be further reduced because the number of bits for determining an offset value is less than that for determining an absolute power level (e.g., Y is less or smaller than X).

Figure 7:
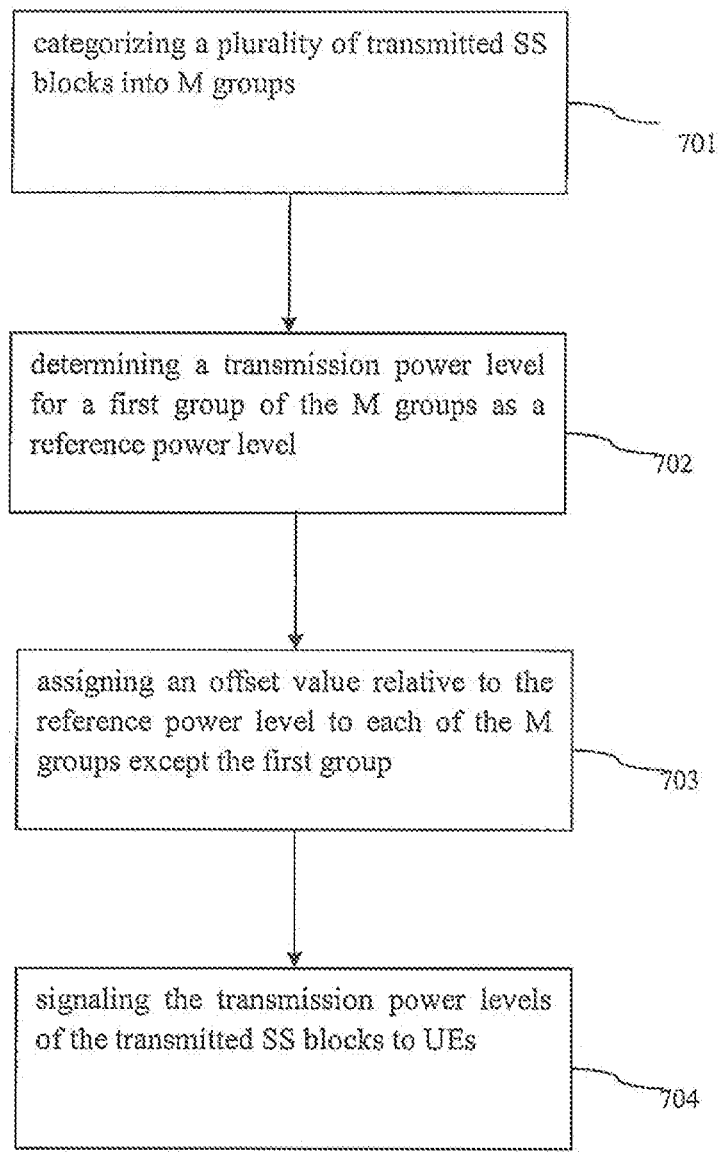
FIG. 7 illustrates a method of signaling transmission power levels for SS blocks according to some embodiments of the present disclosure.

FIG. 7 illustrates a method of signaling transmission power levels for SS blocks according to some embodiments of the disclosure.

In 701, a number of SS blocks are categorized into M groups, wherein M is an integer. For example, as shown in FIG. 5B, 64 SS blocks (SS block 0, SS block 1 . . . SS block 63) are illustrated, where SS block 0, SS block 2, SS block 8, SS block 10, SS block 16, SS block 18, SS block 24, SS block 26, SS block 48, SS block 50, SS block 56 and SS block 58 are transmitted. As shown in FIG. 5B, a base station may configure SS block 0, SS block 2, SS block 8, SS block 10, SS block 16 and SS block 18 into a group G1, configure SS block 24 and SS block 26 into a group G2 and configure SS block 48, SS block 50, SS block 56 and SS block 58 into a group G3.

In 702 of FIG. 7, a reference power level is determined for one of M groups (also referred to as "the first group"), wherein M is an integer. In some embodiments, the reference power level is an absolute transmission power (dBm). In some embodiments, the reference power level can be determined by X bits, wherein X is an integer. In some embodiments, X is 7 or any other integers.

In 703, an offset value relative to the reference power level is assigned to each of the groups except the first group. The offset value is a difference between the power level of the assigned group and the reference power level. In some embodiments, the offset value can be determined by Y bits, wherein Y is an integer. For example, the offset value can be expressed by 2 bits, such as {−3, 0, +3, +6} (dBm) or any other number of bits. In some embodiments, the SS blocks in the same group include or share a same power level (i.e., the reference power level plus the offset value). For example, the SS blocks in the group G1 (including SS block 0, SS block 2, SS block 8, SS block 10, SS block 16 and SS block 18) are transmitted in the same power level. In some embodiments, the SS blocks of the group G1, the group G2 and the group G3 include different power levels. For example, the SS blocks of the group G1 and the SS blocks of the group G2 or the group G3 are transmitted at different power levels. In some other embodiments of the present disclosure, the SS blocks of the group G1, the group G2 and the group G3 may include or share a same power level. The power level P1 may be the same to the power level P2. The power level P1 may be different from the power level P2. The power level P1 may be the same to the power level P3. The power level P1 may be different from the power level P3. The power level P2 may be the same to the power level P3. The power level P2 may be different from the power level P3.

In 704, the power levels of the transmitted SS blocks are transmitted or signaled to an UE. In some embodiments, the power levels of the transmitted SS blocks can be determined by Z bits, wherein Z is an integer. In some embodiments, $Z=X+(M-1)*Y$. As compared to the embodiment in FIG. 6, since the transmission power level of one of the M groups is used or assigned or determined as the reference power level, the total number (i.e., Z) of the bits for signaling the power levels of the transmitted SS blocks can be further reduced.

Figure 8A:
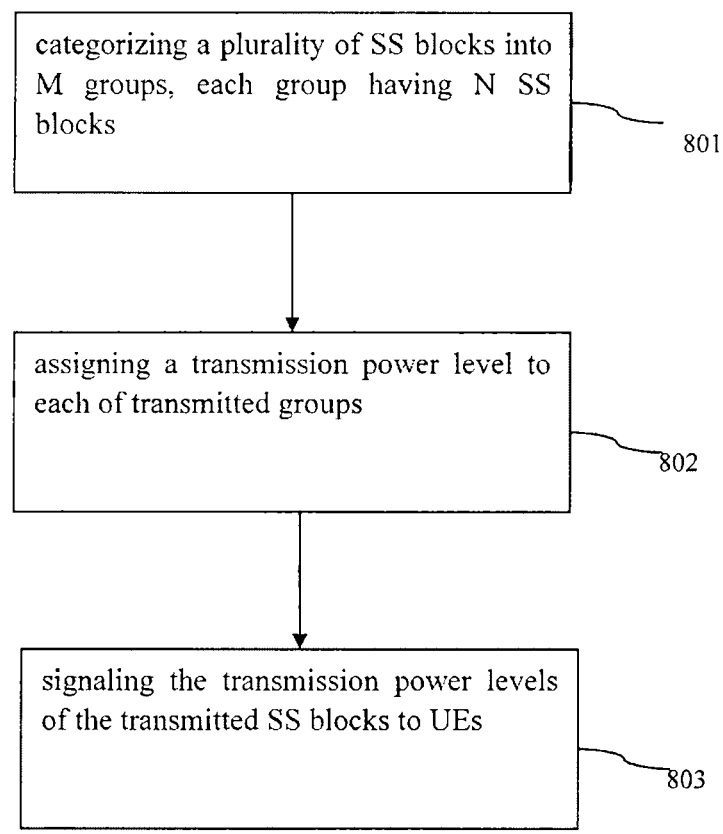
FIG. 8A illustrates a method of signaling transmission power levels for SS blocks according to some embodiments of the present disclosure.

FIG. 8A illustrates a method of signaling transmission power levels for SS blocks according to some embodiments of the present disclosure.

Figure 8B:
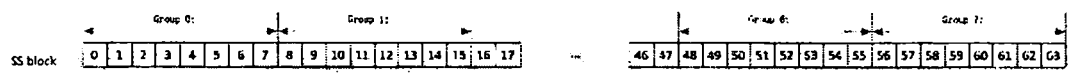
FIG. 8B illustrates an example of signaling transmission power levels for SS blocks according to some embodiments of the present disclosure.

In 801, a number of SS blocks are categorized into M groups, each group having N SS blocks, wherein M and N are integers. In some embodiments, M and N are 8 or any other integers. For example, as shown in FIG. 8B, which illustrates an example of signaling transmission power levels for SS blocks according to some embodiments of the present disclosure, 64 SS blocks (SS block 0, SS block 1 . . . SS block 63) are illustrated, where 8 SS blocks are categorized into a group. For example, a base station may configure SS blocks 0-7 into a group (Group 0), configure SS blocks 8-15 into a group (Group 1) and the like.

Referring back to FIG. 8A, in 802, a transmission power level is assigned to each of P transmitted groups, wherein P is an integer and 1<=P<=M.

For example, referring to FIG. 8B, if the Group-Bitmap is "10000001" and "Bitmap in Group" is "11111110," SS blocks 0-6 in Group 0 and SS blocks 56-62 in Group 7 are transmitted, and thus in this case, P is 2. Therefore, the transmission power levels are assigned to Group 0 and Group 7. In some embodiments, the transmission power level is an absolute transmission power (dBm). In some embodiments, each transmission power level can be determined by X bits, wherein X is an integer. In some embodiments, X is 7 or any other integers. In some embodiments, the SS blocks in the group include or share a same power level. For example, the SS blocks in Group 0 (including SS blocks 0-7) are transmitted in the same power level. In some embodiments, the SS blocks in different groups include different power levels. For example, the SS blocks of Group 0 and the SS blocks of Group 7 are transmitted in different power levels. In some other embodiments of the present disclosure, the SS blocks of Group 0 and Group 7 may include or share a same power level.

Referring back to FIG. 8A, in 803, the transmission power levels of the transmitted SS blocks are transmitted or signaled to UEs. In some embodiments, the transmission power levels of the transmitted SS blocks can be determined by Z bits, wherein Z is an integer. In some embodiments, $Z=X*P$. Because the SS blocks are categorized into groups first and then the transmission power levels are assigned to the transmitted groups rather than the transmitted SS blocks, the total number (i.e., Z) of the bits for signaling the transmission power levels of the transmitted SS blocks can be reduced. In addition, the transmission power level is only assigned to the transmitted group rather than all groups, the total number (i.e., Z) of the bits for signaling the transmission power levels of the transmitted SS blocks can be further reduced.

Figure 9:
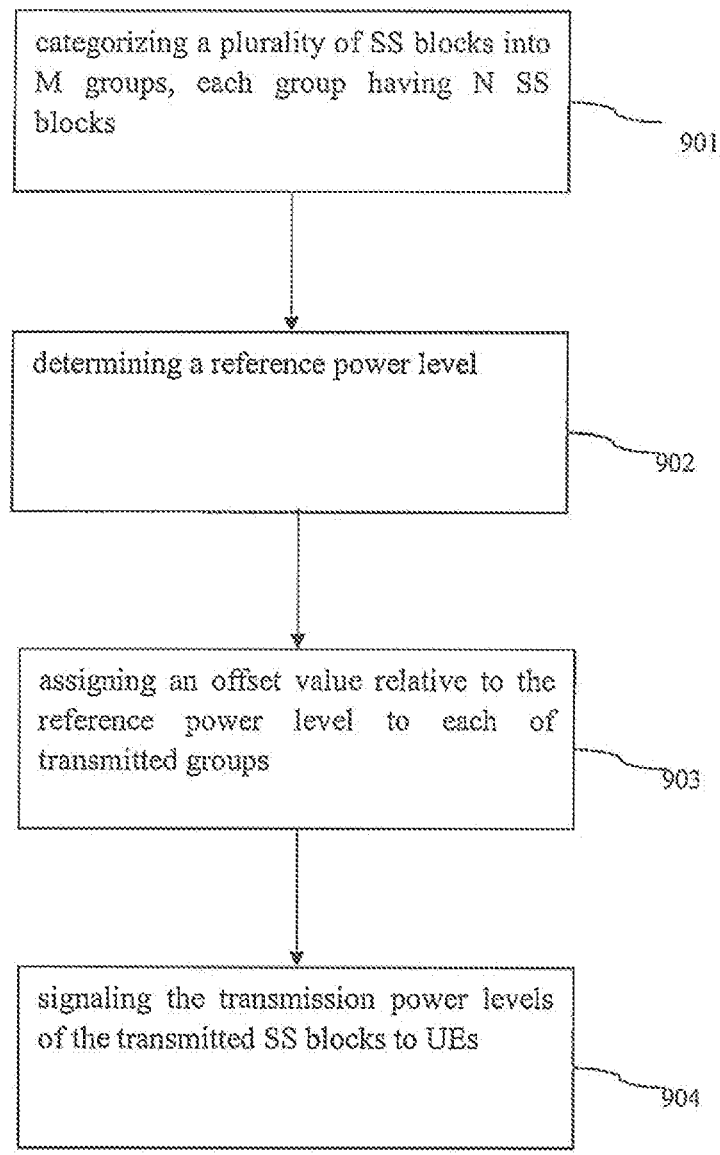
FIG. 9 illustrates a method of signaling transmission power levels for SS blocks according to some embodiments of the present disclosure.

FIG. 9 illustrates a method of signaling transmission power levels for SS blocks according to some embodiments of the disclosure.

In 901, a number of SS blocks are categorized into M groups, each group having N SS blocks, wherein M and N are integers. In some embodiments, M and N are 8 or any other integers. For example, as shown in FIG. 8B, 64 SS blocks (SS block 0, SS block 1 . . . SS block 63) are illustrated, where 8 SS blocks are categorized into a group. For example, a base station may configure SS blocks 0-7 into one group (Group 0), configure SS blocks 8-15 into another group (Group 1) and so forth.

Referring back to FIG. 9, in 902, a reference power level is determined. In some embodiments, the reference power level is an absolute transmission power (dBm). In some embodiments, the reference power level can be determined by X bits, wherein X is an integer. In some embodiments, X is 7 or any other integers.

In 903, an offset value relative to the reference power level is assigned to each of P transmitted groups, wherein P is an integer and 1<=P<=M.

For example, referring to FIG. 8B, if the Group-Bitmap is "10000001" and "Bitmap in Group" is "11111110," SS blocks 0-6 in Group 0 and SS blocks 56-62 in Group 7 are transmitted, and thus in this case, P is 2. Therefore, the offset values are assigned to Group 0 and Group 7. The offset value is a difference between the power level of the assigned group and the reference power level. In some embodiments, the offset value can be determined by Y bits, wherein Y is an integer. For example, the offset value can be expressed by 2 bits, such as {-3, 0, +3, +6} (dBm) or any other number of bits. In some embodiments, the SS blocks in the group include or share a same power level (i.e., the reference power level plus the offset value). For example, the SS blocks in Group 0 (including SS blocks 0-7) are transmitted in the same power level. In some embodiments, the SS blocks in different groups include different power levels. For example, the SS blocks of Group 0 and the SS blocks of Group 7 are transmitted in different power levels. In some embodiments of the present disclosure, the SS blocks of Group 0 and Group 7 may include or share a same power level.

Referring back to FIG. 9, in 904, the transmission power levels of the transmitted SS blocks are transmitted or signaled to UEs. In some embodiments, the transmission power levels of the transmitted SS blocks can be determined by Z bits, wherein Z is an integer. In some embodiments, $Z=X+P*Y$. Because the transmitted SS blocks are categorized into groups and then the transmission power levels are assigned to the transmitted groups rather than the transmitted SS blocks, the total number (i.e., Z) of the bits for signaling the transmission power levels of the transmitted SS blocks can be reduced. In addition, as compared to the embodiment of FIG. 8A, the total number (i.e., Z) of the bits for signaling the power levels of the transmitted SS blocks can be further reduced because the number of bits for determining an offset value is less or smaller than that for determining an absolute power level (e.g., Y is less than X).

Figure 10:
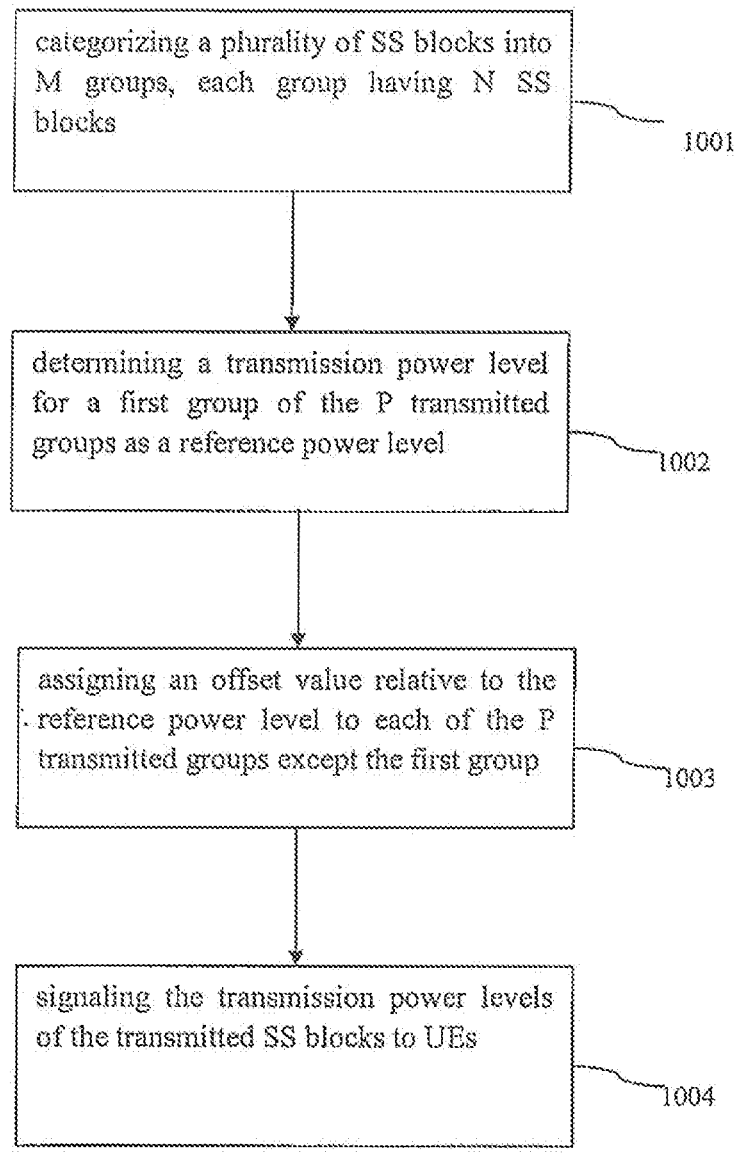
FIG. 10 illustrates a method of signaling transmission power levels for SS blocks according to some embodiments of the present disclosure.

FIG. 10 illustrates a method of signaling transmission power levels for SS blocks according to some embodiments of the present disclosure.

In 1001, a number of SS blocks are categorized into M groups, each group having N SS blocks, wherein M and N are integers. In some embodiments, M and N are 8 or any other integers.

For example, as shown in FIG. 8B, 64 SS blocks (SS block 0, SS block 1 . . . SS block 63) are illustrated, where every 8 SS blocks are categorized into a group. For example, a base station may configure SS blocks 0-7 into a group (Group 0), configure SS blocks 8-15 into another group (Group 1) and the like.

Referring back to FIG. 10, in 1002, a reference power level is determined for one of P transmitted groups (also referred to as "the first group"), wherein P is an integer and 1<=P<=M. In some embodiments, the reference power level is an absolute transmission power (dBm). In some embodiments, the reference power level can be determined by X bits, wherein X is an integer. In some embodiments, X is 7 or any other integers.

In 1003, an offset value relative to the reference power level is assigned to each of the transmitted groups except the first group. The offset value is a difference between the power level of the assigned group and the reference power level. In some embodiments, the offset value can be determined by Y bits, wherein Y is an integer. For example, the offset value can be expressed by 2 bits, such as {-3, 0, +3, +6} (dBm) or any other number of bits. In some embodiments, the SS blocks in the group include or share a same power level (e.g., a sum of the reference power level plus the offset value).

For example, as shown in FIG. 8B, the SS blocks in Group 0 (including SS blocks 0-7) are transmitted in the same power level. In some embodiments, the SS blocks in different groups include different power levels. For example, as shown in FIG. 8B, the SS blocks of Group 0 and the SS blocks of Group 7 are transmitted in different power levels. In some other embodiments of the present disclosure, the SS blocks of Group 0 and Group 7 may include or share a same power level.

In 1004, the power levels of the transmitted SS blocks are transmitted or signaled to UEs. In some embodiments, the power levels of the transmitted SS blocks can be determined by Z bits, wherein Z is an integer. In some embodiments, $Z=X+(P-1)*Y$. In comparison with the embodiment in FIG. 9, since the transmission power level of one of the transmitted P groups is used, assigned or determined as the reference power level, the total number (i.e., Z) of the bits for signaling the power levels of the transmitted SS blocks can be further reduced.

Figure 11A:
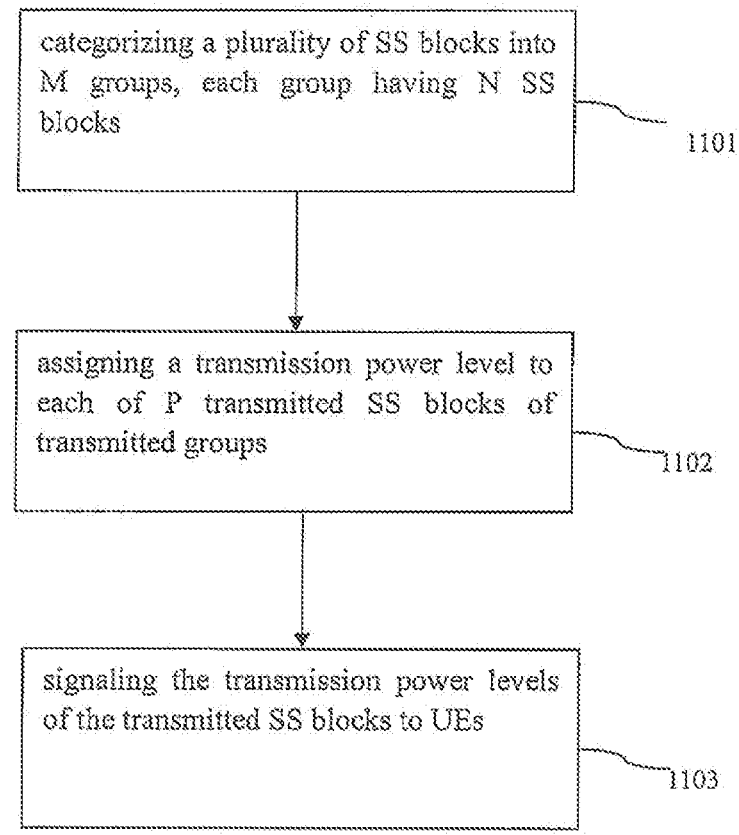
FIG. 11A illustrates a method of signaling transmission power levels for SS blocks according to some embodiments of the present disclosure.

FIG. 11A illustrates a method of signaling transmission power levels for SS blocks according to some embodiments of the present disclosure.

In 1101, a number of SS blocks are categorized into M groups, each group having N SS blocks, wherein M and N are integers. In some embodiments, M and N are 8 or any other integers.

Figure 11B:
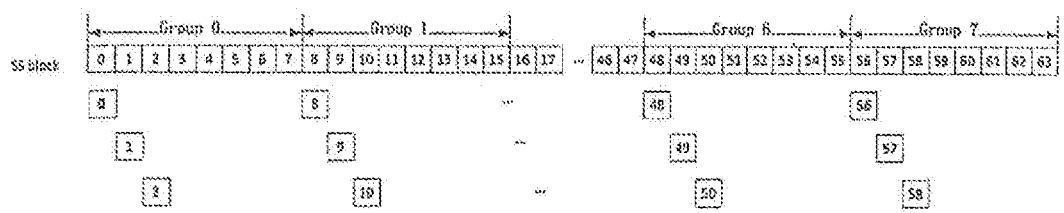
FIG. 11B illustrates an example of signaling transmission power levels for SS blocks according to some embodiments of the present disclosure.

For example, referring to FIG. 11B, which illustrates an example of signaling transmission power levels for SS blocks according to some embodiments of the present disclosure, 64 SS blocks (SS block 0, SS block 1 . . . SS block 63) are illustrated, where 8 SS blocks are categorized into a group. For example, a base station may configure SS blocks 0-7 into a group (Group 0), and configure SS blocks 8-15 into another group (Group 1) and the like.

Referring back to FIG. 11A, in 1102, a transmission power level is assigned to each of P transmitted SS blocks in each transmitted group, wherein P is an integer and 1<=P<=N.

For example, referring to FIG. 1B, if the Group-Bitmap is "11111111" and "Bitmap in Group" is "10000001," the first SS block and the eighth SS block in each of the groups (Groups 0-7) are transmitted, and thus in this case, P is 2. In some embodiments, the transmission power level is an absolute transmission power (dBm). In some embodiments, each transmission power level can be determined by X bits, wherein X is an integer. In some embodiments, X is 7 or any other integers. In some embodiments, the SS blocks having a same ordinal in each of the transmitted groups include or share a same power level. For example, as shown in FIG. 11B, first SS blocks (e.g., SS block 0, SS block 8, SS block 16, SS block 24, SS block 32, SS block 40, SS block 48 and SS block 56) in each of the transmitted groups are transmitted in the same power level. In some embodiments, the SS blocks with different ordinals in a transmitted group may include different power levels. For example, as shown in FIG. 11B, the first SS block (SS block 0) in Group 0 and the second SS block (SS block 1) in Group 0 may be transmitted in different power levels. In some other embodiments of the present disclosure, the SS blocks with different ordinals in a transmitted group may include or share a same power level.

Referring back to FIG. 11A, in 1103, the transmission power levels of the transmitted SS blocks are transmitted or signaled to UEs. In some embodiments, the transmission power levels of the transmitted SS blocks can be determined by Z bits, wherein Z is an integer. In some embodiments, Z=X*P. Because the SS blocks having a same ordinal in each of the transmitted groups include or share a same power level, the total number (i.e., Z) of the bits for signaling the transmission power levels of the transmitted SS blocks can be reduced. The transmission power level is assigned to the transmitted group(s) rather than all groups, the total number (i.e., Z) of the bits for signaling the transmission power levels of the transmitted SS blocks can be further reduced.

Figure 12:
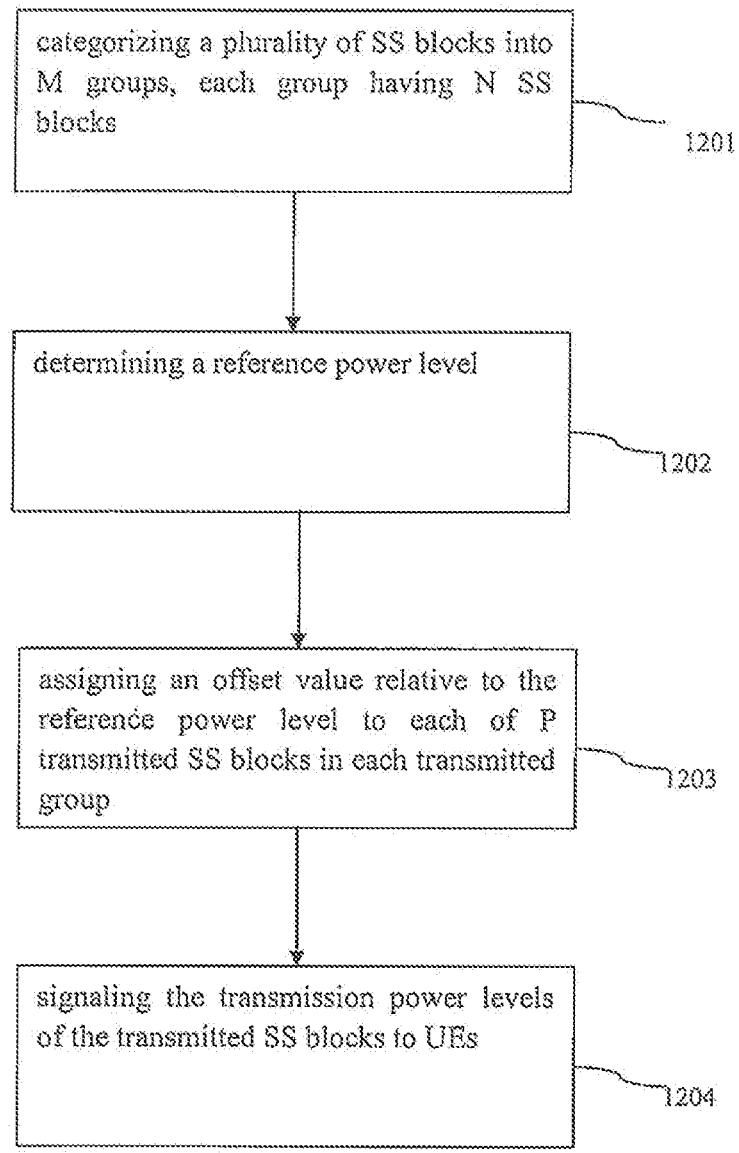
FIG. 12 illustrates a method of signaling transmission power levels for SS blocks according to some embodiments of the preset disclosure.

FIG. 12 illustrates a method of signaling transmission power levels for SS blocks according to some embodiments of the present disclosure.

In 1201, a number of SS blocks are categorized into M groups, each group having N SS blocks, wherein M and N are integers. In some embodiments, M and N are 8 or any other integers.

For example, as shown in FIG. 11B, 64 SS blocks (SS block 0, SS block 1 . . . SS block 63) are illustrated, where 8 SS blocks are categorized into a group. For example, a base station may configure SS blocks 0-7 into a group (Group 0), configure SS blocks 8-15 into another group (Group 1) and the like.

Referring back to FIG. 12, in 1202, a reference power level is determined. In some embodiments, the reference power level is an absolute transmission power (dBm). In some embodiments, the reference power level can be determined by X bits, wherein X is an integer. In some embodiments, X is 7 or any other integers.

In 1203, an offset value relative to the reference power level is assigned to each of P transmitted SS blocks in each transmitted group, wherein P is an integer and 1<=P<=N. For example, if the Group-Bitmap is "11111111" and "Bitmap in Group" is "10000001," the first and the eighth SS blocks in each of the groups (Groups 0-7) are transmitted, and thus in this case, P is 2. The offset value is a difference between the power level of the assigned SS blocks and the reference power level. In some embodiments, the offset value can be determined by Y bits, wherein Y is an integer. For example, the offset value can be expressed by 2 bits, such as {−3, 0, +3, +6} (dBm) or any other number of bits. In some embodiments, the SS blocks having a same ordinal in each of the transmitted groups include or share a same power level (e.g., a sum of the reference power level plus the offset value).

For example, as shown in FIG. 11B, the first SS blocks (e.g., SS block 0, SS block 8, SS block 16, SS block 24, SS block 32, SS block 40, SS block 48 and SS block 56) in the transmitted groups are transmitted in the same power level. In some embodiments, the SS blocks with different ordinals in a transmitted group may include different power levels. For example, as shown in FIG. 11B, the first SS block (SS block 0) in Group 0 and the second SS block (SS block 1) in Group 0 may be transmitted in different power levels. In some other embodiments of the present disclosure, the SS blocks with different ordinals in a transmitted group may include or share the same power level.

In 1204, the transmission power levels of the transmitted SS blocks are transmitted or signaled to UEs. In some embodiments, the transmission power levels of the trans-mitted SS blocks can be determined by Z bits, wherein Z is an integer. In some embodiments, Z=X+P*Y. Because the SS blocks having a same ordinal in each of the transmitted groups include or share a same power level, the total number (i.e., Z) of the bits for signaling the transmission power levels of the transmitted SS blocks can be reduce. In addition, as compared to the embodiment of FIG. 11A, the total number (i.e., Z) of the bits for signaling the power levels of the transmitted SS blocks can be further reduced because the number of bits for determining an offset value is less or smaller than that for determining an absolute power level (i.e., Y is less then X).

Figure 13:
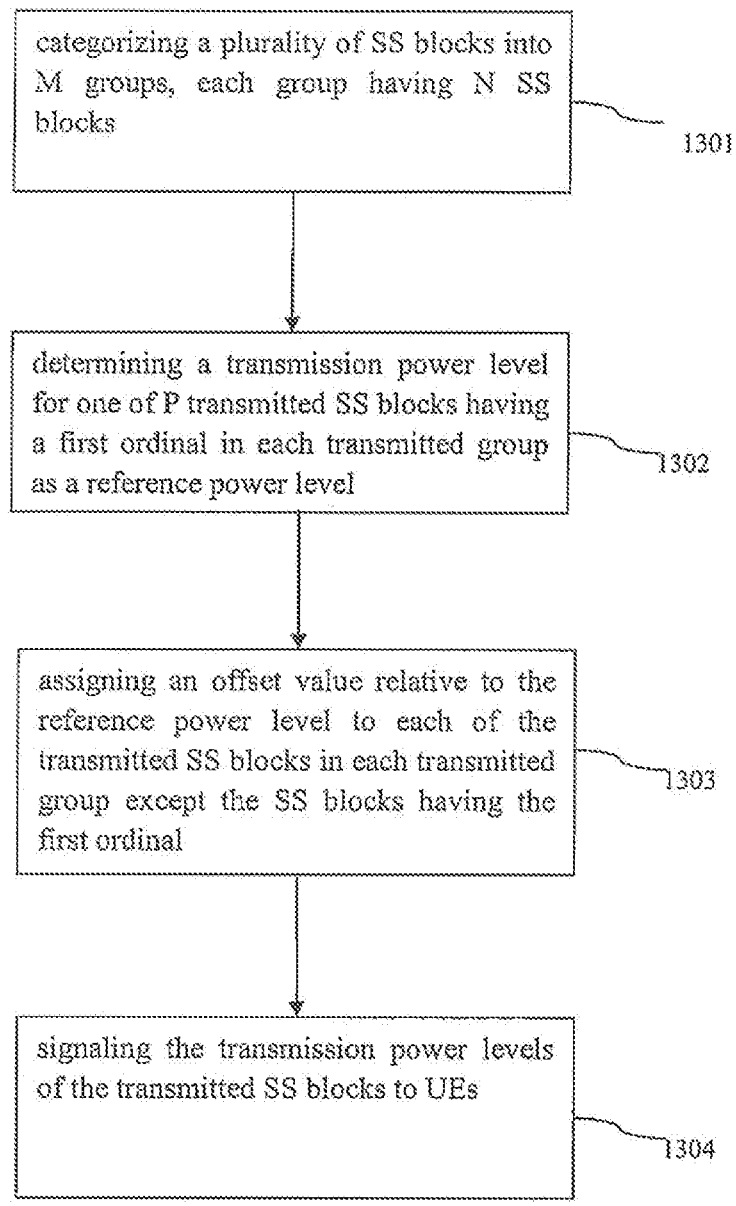
FIG. 13 illustrates a method of signaling transmission power levels for SS blocks according to some embodiments of the present disclosure.

FIG. 13 illustrates a method of signaling transmission power levels for SS blocks according to some embodiments of the present disclosure.

In 1301, a number of SS blocks are categorized into M groups, each group having N SS blocks, wherein M and N are integers. In some embodiments, M and N are 8 or any other integers.

For example, as shown in FIG. 11B, 64 SS blocks (SS block 0, SS block 1 . . . SS block 63) are illustrated, where 8 SS blocks are categorized into a group. For example, a base station may configure SS blocks 0-7 into a group (Group 0), configure SS blocks 8-15 into another group (Group 1) and the like.

Referring back to FIG. 13, in 1302, a reference power level is determined for one of P transmitted SS blocks having a first ordinal in each of the transmitted groups, wherein P is an integer and 1<=P<=N. In some embodiments, the reference power level is an absolute transmission power (dBm). In some embodiments, the reference power level can be determined by X bits, wherein X is an integer. In some embodiments, X is 7 or any other integers.

In 1303, an offset value relative to the reference power level is assigned to each of the transmitted SS blocks in each transmitted group except the SS blocks having the first ordinal. The offset value is a difference between the power level of the assigned SS block and the reference power level. In some embodiments, the offset value can be determined by Y bits, wherein Y is an integer. For example, the offset value can be expressed by 2 bits, such as {−3, 0, +3, +6} (dBm) or any other number of bits. In some embodiments, the SS blocks having a same ordinal in each of the transmitted groups include or share a same power level (e.g., a sum of the reference power level plus the offset value).

For example, as shown in FIG. 11B, the first SS blocks (i.e., SS block 0, SS block 8, SS block 16, SS block 24, SS block 32, SS block 40, SS block 48 and SS block 56) in the transmitted groups are transmitted in the same power level. In some embodiments, the SS blocks with different ordinals in a transmitted group may include different power levels. For example, as shown in FIG. 11B, the first SS block (SS block 0) in Group 0 and the second SS block (SS block 1) in Group 0 may be transmitted in different power levels. In some other embodiments of the present disclosure, the SS blocks with different ordinals in a transmitted group may include or share a same power level.

Referring back to FIG. 13, in 1304, the power levels of the transmitted SS blocks are transmitted or signaled to UEs. In some embodiments, the power levels of the transmitted SS blocks can be determined by Z bits, wherein Z is an integer. In some embodiments, Z=X+(P−1)*Y. In comparison with the embodiment in FIG. 12, since the transmission power level of one of the P transmitted SS blocks in each transmitted groups is used, assigned or determined as the reference power level, the total number (i.e., Z) of the bits for signaling the power levels of the transmitted SS blocks can be further reduced.

In some embodiments, one or more or all of the operations as shown in FIGS. 3-13 can be performed by an apparatus, a device or a system. For example, one or more or all of the operations as shown in FIGS. 3-13 can be performed by a base station or other processing unit(s) reside in the base station.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

What is claimed is:

1. A method comprising:
categorizing a number of synchronization signal (SS) blocks into M groups, each group having N SS blocks, wherein M and N are integers, and M is greater than 1; and
assigning a power level for P transmitted group(s), wherein P is an integer and $1<=P<M$, wherein the SS blocks in each of the P transmitted groups are transmitted in a same assigned power level, and the number of P transmitted group(s) is less than the total number of M groups.

2. The method of claim 1, wherein the power level assigned for each of the P transmitted groups is associated with a power value.

3. The method of claim 2, further comprising:
determining X bits associated with the assigned power levels, wherein X is an integer; and
determining Z bits indicating each of the assigned power levels of the SS blocks, wherein Z is an integer.

4. The method of claim 3, wherein $Z=X*P$.

5. The method of claim 1, wherein the power level assigned for each of the P transmitted groups is associated with an offset value relative to a reference power level.

6. The method of claim 5, further comprising:
determining X bits associated with the assigned power levels, wherein X is an integer;
determining Y bits associated with the offset value, wherein Y is an integer; and
determining Z bits indicating each of the assigned power levels of the SS blocks, wherein Z is an integer.

7. The method of claim 6, wherein $Z=X+P*Y$.

8. The method of claim 1, further comprising:
determining the assigned power level of one of the P transmitted groups as a reference power level; and
determining an offset value relative to the reference power level for each of the rest of the P transmitted groups.

9. The method of claim 8, further comprising:
determining X bits associated with the assigned power levels, wherein X is an integer;
determining Y bits associated with the offset value, wherein Y is an integer; and
determining Z bits indicating each of the assigned power levels of the SS blocks, wherein Z is an integer.

10. The method of claim 8, wherein $Z=X+(P-1)*Y$.

11. The method of claim 1, wherein:
the P transmitted groups of the SS blocks comprises a first group and a second group; and
the assigned power level for transmitting the SS blocks in the first group is different from the assigned power level for transmitting the SS blocks in the second group.

12. The method of claim 1, wherein:
the P transmitted groups of the SS blocks comprises a first group and a second group; and
the assigned power level for transmitting the SS blocks in the first group is substantially the same as the assigned power level for transmitting the SS blocks in the second group.

13. A method comprising:
categorizing a number of SS blocks into M groups, each group having N SS blocks, wherein M and N are integers, and M is greater than 1; and
assigning a power level for P transmitted SS blocks in each of transmitted group(s), wherein P is an integer and $1<=P<M$, wherein the SS blocks in each of the P transmitted groups are transmitted in a same assigned power level, and the number of P transmitted group(s) is less than the total number of M groups.

14. The method of claim 13, wherein the power level for transmitting the SS blocks having the first ordinal is associated with a power value.

15. The method of claim 14, further comprising:
determining X bits associated with power levels for transmitting M groups of SS blocks, wherein X is an integer; and
determining Z bits indicating each of the power levels for transmitting M groups of SS blocks, wherein Z is an integer, and $Z=X*P$.

16. The method of claim 13, wherein the power level for transmitting the SS blocks having the first ordinal in each of the transmitted groups is associated with an offset value relative to a reference power level.

17. The method of claim 16, further comprising:
determining X bits associated with power levels for transmitting M groups of SS blocks, wherein X is an integer;
determining Y bits associated with the offset value, wherein Y is an integer; and
determining Z bits indicating each of the power levels for transmitting M groups of SS blocks, wherein Z is an integer, and $Z=X+P*Y$.

18. The method of claim 13, further comprising:
determining the power level for the transmitted SS blocks having the first ordinal in each of the transmitted groups as a reference power level; and
determining an offset value relative to the reference power level.

19. The method of claim 18, further comprising:
determining X bits associated with the reference power level, wherein X is an integer;
determining Y bits associated with the offset value, wherein Y is an integer; and
determining Z bits indicating each of the power levels for transmitting M groups of SS blocks, wherein Z is an integer, and $Z=X+(P-1)*Y$.

20. A method comprising:
determining a reference power level for P groups of transmitted SS blocks out of M total groups of SS blocks, wherein P and M are integers, M is greater than 1, and a number of P groups of transmitted SS blocks is less than a total number of M groups of SS blocks; and assigning an offset value relative to the reference power level for each of the P groups of transmitted SS blocks.

21. The method of claim 20, further comprising:

determining X bits associated with the reference power level, wherein X is an integer;

determining Y bits associated with the offset value, wherein Y is an integer; and determining Z bits indicating power levels for the P groups of transmitted SS blocks, wherein Z is an integer, and $Z=X+M*P$.

22. A method comprising:

determining a power level for a first SS block of P groups of transmitted SS blocks out of M total groups of SS blocks as a reference power level, wherein P and M are integers is an integer, M is greater than 1, and a number of P groups of transmitted SS blocks is less than a total number of M groups of SS blocks; and assigning an offset value relative to the reference power level to each of the P groups of transmitted SS blocks except the first group of SS blocks.

23. The method of claim 22, further comprising:

determining X bits associated with the reference power level, wherein X is an integer;

determining Y bits associated with the offset value, wherein Y is an integer; and determining Z bits indicating power levels for the P groups of transmitted SS blocks, wherein $Z=X+(P-1)*Y$.

* * * * *